(12) United States Patent
Takagi et al.

(10) Patent No.: US 8,399,140 B2
(45) Date of Patent: Mar. 19, 2013

(54) FUEL CELL SYSTEM

(75) Inventors: Narihiro Takagi, Saitama (JP); Kuri Kasuya, Saitama (JP)

(73) Assignee: Honda Motor Co., Ltd, Tokyo (JP)

( * ) Notice: Subject to any disclaimer, the term of this patent is extended or adjusted under 35 U.S.C. 154(b) by 586 days.

(21) Appl. No.: 12/631,448

(22) Filed: Dec. 4, 2009

(65) Prior Publication Data

US 2010/0143757 A1   Jun. 10, 2010

(30) Foreign Application Priority Data

Dec. 5, 2008   (JP) ................................ 2008-310348

(51) Int. Cl.
*H01M 8/04* (2006.01)
(52) U.S. Cl. ........ 429/428; 429/429; 429/443; 429/446; 429/455; 429/456; 429/512; 429/513
(58) Field of Classification Search .................. None
See application file for complete search history.

(56) References Cited

U.S. PATENT DOCUMENTS

| | | | |
|---|---|---|---|
| 6,129,333 A * | 10/2000 | Ma .................................. | 251/68 |
| 2007/0166598 A1* | 7/2007 | Joos et al. ....................... | 429/38 |
| 2008/0226964 A1* | 9/2008 | Nishiyama et al. ............. | 429/34 |

FOREIGN PATENT DOCUMENTS

| | | |
|---|---|---|
| JP | 2006-221836 A | 8/2006 |
| JP | 2007-247743 A | 9/2007 |
| JP | 2008-218072 A | 9/2008 |
| JP | 2008-251315 A | 10/2008 |

OTHER PUBLICATIONS

Japanese Office Action dated May 10, 2011, issued in corresponding Japanese Patent Application No. 2008-310348.

* cited by examiner

*Primary Examiner* — Jeffrey Wollschlager
(74) *Attorney, Agent, or Firm* — Westerman, Hattori, Daniels & Adrian, LLP (57) ABSTRACT

A fuel cell system includes: a fuel cell; a normally-closed first shut-off valve provided upstream from the fuel cell and opening and closing pipes c1 and allowing air supplied from an air pump to pass therethrough; a normally-closed second shut-off valve opening and closing a pipe allowing cathode off-gas, discharged from the fuel cell, to pass therethrough; a valve-driving section for opening and closing discs of the shut-off valves; and valve lock units maintaining discs of the shut-off valves in open state when the cathode is released by opening the first shut-off valve and the second shut-off valve during electro-chemical reaction progressing in the fuel cell. This structure provides a simple and small-size fuel cell system capable of maintaining opening state of shut-off valves stably and reliably.

5 Claims, 4 Drawing Sheets

FUEL CELL SYSTEM

CROSS REFERENCE TO RELATED APPLICATIONS

This application claims the foreign priority benefit under Title 35, United States Code, §119 (a)-(d), of Japanese Patent Application No. 2008-310348, filed on Dec. 5, 2008, in the Japan Patent Office, the disclosure of which is herein incorporated by reference in its entirety.

BACKGROUND OF THE INVENTION

1. Field of the Invention

The present invention relates to a fuel cell system capable of sealing a cathode by closing a first shut-off valve and a second shut-off valve after stopping electro-chemical reaction progressing in a fuel cell; and capable of releasing the cathode by opening the first shut-off valve and the second shut-off valve during the electro-chemical reaction progressing in the fuel cell.

2. Description of the Related Art

Japanese Patent Laid-open Publication No. 2008-218072 (hereinafter called Patent Document 1) discloses an example of fuel cell system including a fuel cell having an air-inlet shut-off valve provided to an inlet of a cathode and an air-outlet shut-off valve provided to an outlet of the cathode and preventing gas crossover, i.e. a short circuit caused by either gas passing from one side to the other side of the fuel cell through a membrane while no electro-chemical reaction is under way in the fuel cell, by sealing the cathode by closing the air-inlet shut-off valve and the air-outlet shut-off valve after stopping the electro-chemical reaction progressing in the fuel cell.

The fuel cell system disclosed in Patent Document 1 has a buffer tank for storing air compressed by an air compressor and having a higher pressure than that of air supplied to the fuel cell; and switches the air-inlet shut-off valve and the air-outlet shut-off valve between open state and closed state by using pressure difference between an atmospheric pressure chamber communicating with ambient air and a chamber storing pressurized air supplied from the buffer tank.

Japanese Patent Laid-open Publication No. 2006-221836 (hereinafter called Patent Document 2) discloses a fuel cell system including a fuel cell having two normally-closed electromagnetic valves each provided to an outlet and an inlet of a cathode; and closing the electromagnetic valves while electro-chemical reaction is kept from progressing in the fuel cell.

However, the prior art fuel cell system disclosed in Patent Document 2 has a disadvantage that power output efficiency may be reduced because the fuel cell system uses solenoid valves to which electricity must be supplied continuously while they are in open state. In particular, the fuel cell has to bear more reduced power output efficiency if greater electricity is necessary for opening the solenoid valves.

The prior art of Patent Document 1, disclosing that each shut-off valve is switched by using air pressure (i.e. pneumatically) supplied from the buffer tank, may have another disadvantage that the shut-off valves, which must be opened during electro-chemical reaction in the fuel cell, may be closed if air pressure for maintaining the shut-off valves in open state fluctuates or is reduced for some reasons. Such abnormal state of air pressure in the fuel cell system may result in damage to the fuel cell system or system down of the fuel cell system.

The prior art fuel cell system disclosed in Patent Document 1 is also disadvantageous due to its complexity and large size since a control mechanism for opening and closing the shut-off valves uses many parts including a buffer tank; valves for switching air supplied from the buffer tank to each shut-off valve; a shut-off valve for switching air supplied to the buffer tank; and pressure sensors for detecting the pressure in the buffer tank and the likes.

In consideration of a pressure drop which may occur when air pressure for maintaining the open state of shut-off valves fluctuates due to air leakage from air flowpaths or fluctuation of ambient temperature, the prior art fuel cell system of Patent Document 1 needs another control mechanism, e.g. an air-supply mechanism for maintaining air pressure supplied to the shut-off valves in open state.

SUMMARY OF THE INVENTION

The present invention was conceived in view of the aforementioned circumstances, and an object thereof is to provide a simple and small-size fuel cell system capable of preventing a fuel cell from lowering its power output efficiency and capable of maintaining shut-off valves in open state stably and reliably.

In order to achieve the aforementioned object, the present invention provides a fuel cell system which includes: a fuel cell having an anode to which fuel gas is supplied, and a cathode to which oxidant gas is supplied; a first oxidant gas flowpath through which the oxidant gas is supplied to the fuel cell; a second oxidant gas flowpath through which the oxidant gas is discharged from the fuel cell; a first shut-off valve, being normally closed, disposed upstream from the fuel cell and connected to the fuel cell through the first oxidant gas flowpath, the first shut-off valve having a first valve body having a first engagement block connected via a first rod and disposed outside the first shut-off valve; a second shut-off valve, being normally-closed, disposed downstream from the fuel cell and connected to the fuel cell through the second oxidant gas flowpath, the second shut-off valve having a second valve body having a second engagement block connected via a second rod and disposed outside the second shut-off valve; a first opening/closing unit for opening and closing the first shut-off valve; a second opening/closing unit for opening and closing the second shut-off valve; a cathode control unit for sealing the cathode by closing the first shut-off valve and the second shut-off valve by using the first opening/closing unit and the second opening/closing unit after stopping electro-chemical reaction in the fuel cell and for releasing the sealed cathode by opening the first shut-off valve and the second shut-off valve by using the first opening/closing unit and the second opening/closing unit after starting the electro-chemical reaction in the fuel cell; a first valve lock unit having a first lock member and locking the first shut-off valve in open state by engaging the first lock member with the first engagement block of the first shut-off valve; and a second valve lock unit having a second lock member and locking the second shut-off valve in open state by engaging the second lock member with the second engagement block of the second shut-off valve.

The present invention is capable of preventing a fuel cell from lowering its power output efficiency and capable of maintaining the shut-off valves in open state stably and reliably since the fuel cell system according to the present invention has the first and second valve lock units having a first and second lock members for locking the shut-off valves in open state by engaging the lock members with the discs of the shut-off valves, and since the first and second opening/closing units do not consume electricity to maintain the first and second shut-off valves in open state.

In the fuel cell system according to the present invention, the first opening/closing unit may have a first electric drive unit for supplying electricity to the first shut-off valve to switch the first shut-off valve from closed state to open state; the second opening/closing unit may have a second electric drive unit for supplying electricity to the second shut-off valve to switch the second shut-off valve from closed state to open state; and the cathode control unit may stop supplying electricity to the first and second electric drive units after the first and second shut-off valves are locked in open state by the first and second valve lock units.

The present invention can provide a simple and down-sized mechanism since the electrically driven valve-driving section of the present invention using the rotational driving source of an electric motor, uses a fewer number of parts than those of a pneumatic control system having a complex mechanism using many parts e.g. a regulator, a plurality of air-flow control valves, and air-switching valves for moving the discs. In addition, the present invention can provide a more power-saving fuel cell system since the cathode control unit stops supplying electricity to the motors used in the first and second shut-off valves locked in open state by the first and second valve lock units.

In the present invention, negative pressure produced in the cathode sealed by the cathode control unit may suck the first valve body of the first shut-off valve in closed state toward the fuel cell and may suck the second valve body of the second shut-off valve in closed state toward the fuel cell to maintain the first shut-off valve and the second shut-off valve in closed state.

The present invention can use springs having a weaker spring force for pressing the discs toward seat sections of the shut-off valves since the fuel cell system has air flow direction which can obtain negative pressure assisting the discs to close the shut-off valves. Therefore, the fuel cell system can move the discs with a weaker force to open the shut-off valves.

The present invention can provide a simple and small-size fuel cell system capable of preventing a fuel cell from lowering its power output efficiency and capable of maintaining shut-off valves in open state stably and reliably.

BRIEF DESCRIPTION OF THE DRAWINGS

FIGS. 3A to 3C show movements of the first shut-off valve and the second shut-off valve.

DETAILED DESCRIPTION OF THE INVENTION

The structure of a fuel cell system according to an embodiment of the present invention will be explained in detail with reference to FIGS. 1 and 2. Although the embodiment explained herein relates to vehicles including fuel-cell vehicles, the present invention is not limited to fuel cells used in vehicles and can be applied to any other fuel cells used for transportation means including ocean vessels and aircrafts, and for stationary fuel cell systems.

Figure 1:
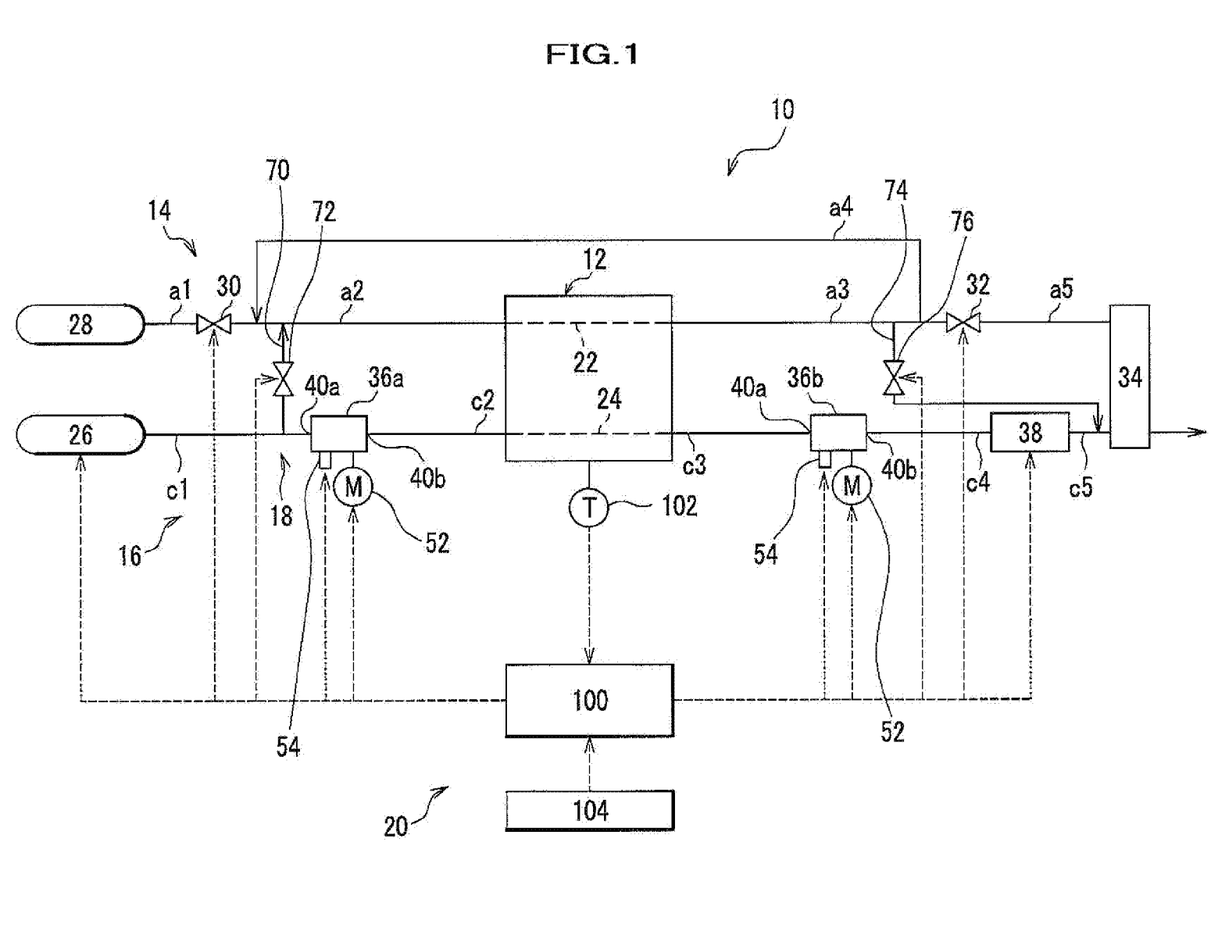
FIG. 1 is a schematic diagram of a fuel cell system according to an embodiment of the present invention.

As shown in FIG. 1, a fuel cell system 10 according to the present embodiment includes a fuel cell 12; an anode system 14; a cathode system 16; an anode-scavenging system 18; and a control system 20.

The fuel cell 12 is a polymer electrolyte fuel cell (PEFC) which includes a plurality of stacked single cells each having a membrane electrode assembly (MEA) placed between two separators (not shown in the drawings).

The MEA includes an electrolyte membrane (e.g. polymer membrane); a cathode; an anode; and the electrolyte membrane disposed therebetween. Both the cathode and the anode have an electrode catalyst layer having a catalyst such as platinum supported on a catalyst support made of carbon black etc. Each separator has an anode flowpath 22 and a cathode flowpath 24, both of which are grooves or through holes.

The fuel cell 12 starts to generate electricity when hydrogen (alternatively called reaction gas or fuel gas) is supplied to the anode; when air (alternatively called reaction gas or oxidant gas) is supplied to the cathode; and when electrochemical reaction occurs on the catalysts included in the anode and the cathode.

The fuel cell 12 generates electricity with an external load (not shown in the drawings) connected to the fuel cell 12 and creates electric current from electrons produced in the electro-chemical reaction. The external load may be a motor for driving a fuel cell vehicle, a capacitor serving as condenser or battery, or an air pump 26 which will be explained later.

The anode system 14 includes a hydrogen tank 28; a shut-off valve 30; a purge valve 32; and pipes a1 to a5 etc.

The hydrogen tank 28 stores highly pressurized and very pure hydrogen and is connected to the shut-off valve 30 disposed downstream of the hydrogen tank 28 through the pipe a1. The shut-off valve 30, which may be an electromagnetic valve, is connected to the inlet of the anode flowpath 22 of the fuel cell 12 disposed downstream of the shut-off valve 30 through the pipe a2.

The purge valve 32, which may be an electromagnetic valve, is connected to the outlet of the anode flowpath 22 of the fuel cell 12 disposed upstream of the purge valve 32 through the pipe a3. Non-reacted hydrogen discharged from the outlet of the anode of the fuel cell 12 returns to the inlet of the anode through the pipe a4. The pipe a4 is connected with the pipe a2 connected to the inlet of the anode flowpath 22, and also connected with the pipe a3 connected to the outlet of the anode flowpath 22.

An ejector, which is not shown in the drawing, is provided at a junction point of the pipe a4 and the pipe a2. The ejector uses negative pressure, created by a flow of the hydrogen supplied from the hydrogen tank 28, to suck gas (hydrogen in this embodiment) returning through the pipe a4. The purge valve 32 is connected with a diluting apparatus 34 through the pipe a5 disposed downstream of the purge valve 32.

The cathode system 16 includes the air pump 26; a first shut-off valve 36a; a second shut-off valve 36b; a back-pressure-regulating valve 38; the diluting apparatus 34; and pipes c1 to c5 (oxidant gas flowpaths) etc.

The air pump 26 may be a mechanical supercharger driven by a motor not shown in the drawings. Air introduced from outside into the air pump 26 is compressed therein and supplied to the fuel cell 12.

The first shut-off valve 36a is connected to the air pump 26 through the pipe c1, and is connected to an inlet of the cathode flowpath 24 through the pipe c2. The second shut-off valve 36b is connected to the outlet of the cathode flowpath 24 of the fuel cell 12 through pipe c3, and is connected to the back-pressure-regulating valve 38 through the pipe c4.

Hereinafter, the structure of the first shut-off valve 36a will be explained and the explanation of the mechanism of the second shut-off valve 36b will be omitted since the first shut-off valve 36a and the second shut-off valve 36b (which may be hereinafter simply called "shut-off valves" or "each shut-off valve") are normally-closed valves and have an identical structure.

Figure 2:
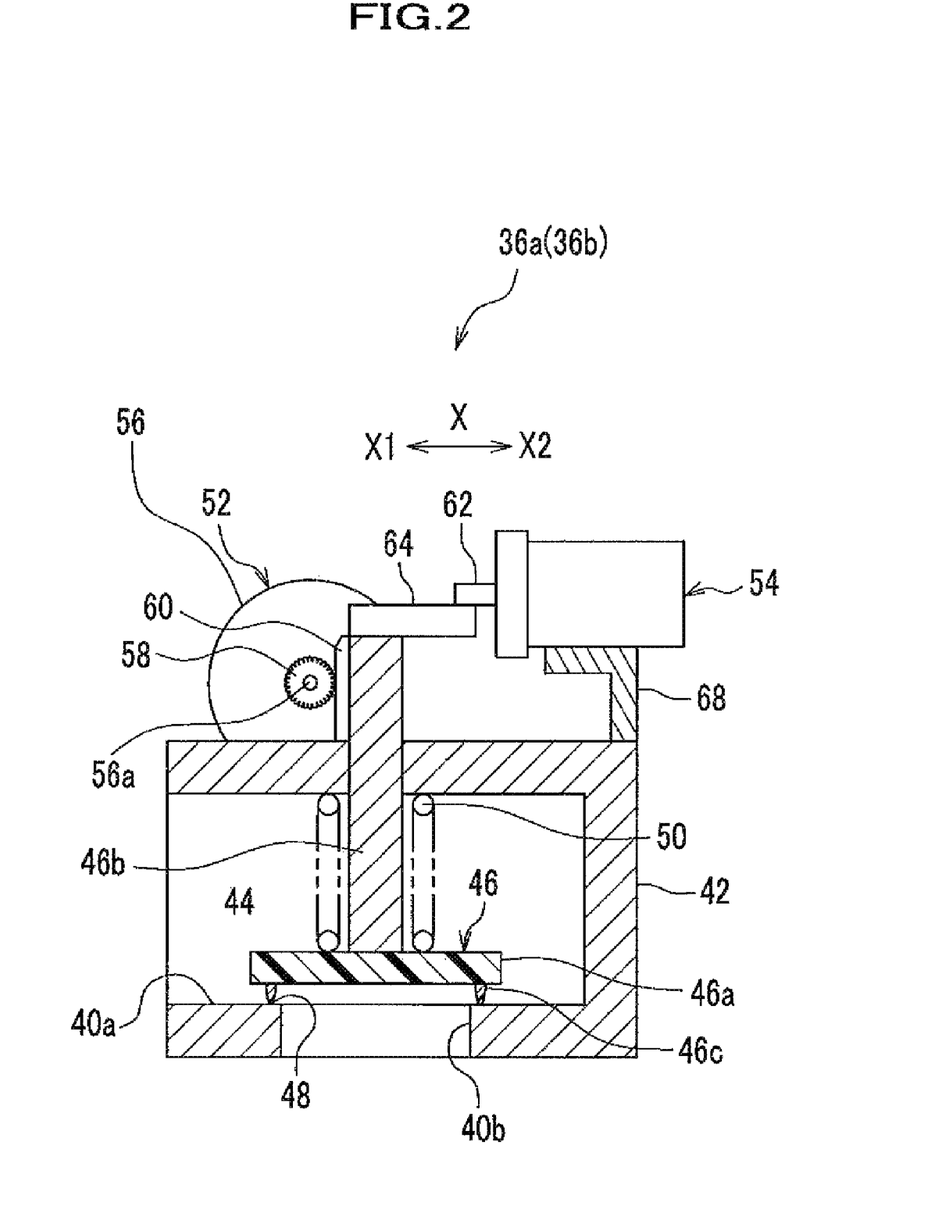
FIG. 2 is a longitudinal cross-sectional view showing a first and second shut-off valves included in the fuel cell system.

As shown in FIG. 2, the first shut-off valve 36a includes: a valve housing 42 having an inlet port 40a into which air (oxidant gas in the present embodiment) is supplied and an outlet port 40b discharging the supplied air; a chamber 44 formed in the valve housing 42; a valve body 46 for turning on or shutting off air flow between the inlet port 40a and the outlet port 40b; a seat section 48 provided in the valve housing 42; a spring 50 pressing the valve body 46 toward the seat section 48; a valve-driving section 52 moving the valve body 46 in two directions i.e. from and toward the seat section 48; and a locking section 54 for maintaining the valve body 46 in open state.

As shown in FIG. 1, the pipe c1 is disposed between the air pump 26 and the inlet port 40a of the valve housing 42 of the first shut-off valve 36a. The pipe c2 is disposed between the outlet port 40b of the valve housing 42 of the first shut-off valve 36a and the cathode flowpath 24 of the fuel cell 12. The pipe c3 is disposed between the outlet of the cathode flowpath 24 of the fuel cell 12 and the inlet port 40a of the valve housing 42 of the second shut-off valve 36b. The pipe c4 is disposed between the outlet port 40b of the second shut-off valve 36b and the back-pressure-regulating valve 38. In the present embodiment, the first shut-off valve 36a and the second shut-off valve 36b have the reverse arrangement of the inlet port 40a and the outlet port 40b (see FIG. 4).

The valve body 46 has a circular-plate disc section 46a; and a rod section 46b attached to the center of the disc section 46a. A valve packing 46c attached on the bottom surface of the disc section 46a is pressed against the seat section 48 of the valve housing 42 to seal the cathode.

The valve-driving section 52 includes, for example: a rotational driving source 56 having an electric drive unit such as a stepper motor etc. and a rotational driving shaft 56a provided therein; a pinion 58 attached on the rotational driving shaft 56a; and a rack section 60, which is formed on an outer periphery of the rod section 46b, exposed from the valve housing 42 and in mesh with the pinion 58. The rotational driving source 56 is fixed on the valve housing 42 via a fixture (not shown in the drawing) attached on the valve housing 42.

In this structure, the rotational driving force produced by the rotational driving source 56 is transmitted to the pinion 58 through the rotational driving shaft 56a and is converted into a linear (vertical) movement of the valve body 46 through the pinion 58 and the rack section 60 being in mesh with each other. Accordingly, when the valve body 46 presses against the seat section 48 and closes the outlet port 40b, communication is shut off between the inlet port 40a and the outlet port 40b; and when the valve body 46 is lifted off from the seat section 48, communication is obtained from the inlet port 40a to the outlet port 40b through the chamber 44 of the valve housing 42.

The locking section 54 includes: a solenoid (not shown in the drawings) made of a wire coil wound in the locking section 54; a fixed core; a movable core, not shown in the drawings, sucked toward the fixed core by the excitation effect of the solenoid to which electricity was supplied; and a lock pin 62 joined to the movable core and capable of extending or retracting in the horizontal direction (indicated by arrows X1 and X2) together with the movable core. An engagement block 64 is joined to an end (e.g. a free end) of the rod section 46b of the valve body 46. The engagement block 64 moves together with the valve body 46 and is locked in open state by the lock pin 62. The valve housing 42 has a support 68 attached thereon for supporting the locking section 54 including the solenoid, the movable core, the fixed core, and the lock pin 62, which are not shown in the drawings.

Figures 3A, 3B, 3C:
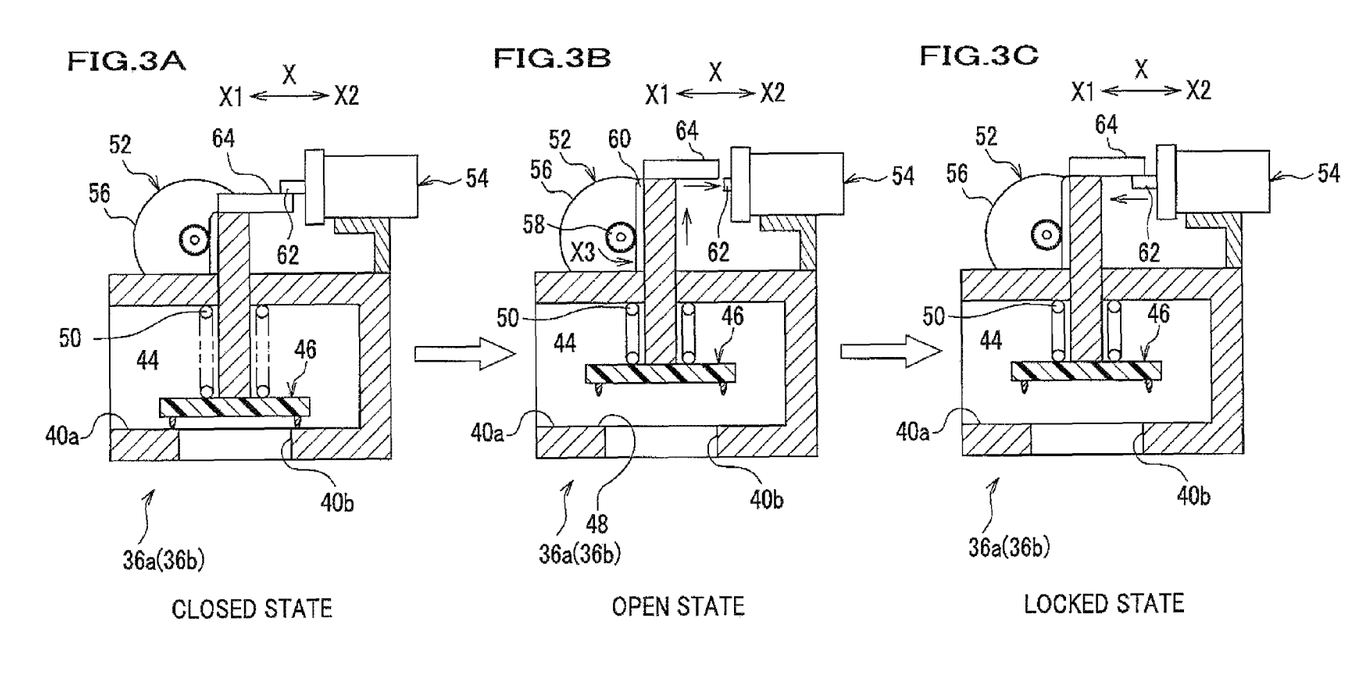
FIG. 3A is a longitudinal cross-sectional view showing the shut-off valve in closed state.
FIG. 3B is a longitudinal cross-sectional view showing the shut-off valve in open state.
FIG. 3C is a longitudinal cross-sectional view showing the shut-off valve locked in open state.

When an electronic control unit (ECU) 100 stops electricity from being supplied to the solenoid, the lock pin 62 protrudes by a predetermined length in the direction indicated by an arrow X1. The lock pin 62 in this state is capable of locking the engagement block 64 as shown in FIG. 3A. When the ECU 100 starts supplying electricity to the solenoid, the lock pin 62 retracts in the direction X2 by the excitation effect of the solenoid. The lock pin 62 in this state is lifted off from the engagement block 64 as shown in FIG. 3B.

The fuel cell system 10 according to the present invention is not limited to use the lock pin 62 which engages with the valve body 46 in the elevated position to maintain the open state of the shut-off valves 36a and 36b. Alternatively, the present invention may omit the lock pin 62 and protrude the movable core, not shown in the drawings, to lock the engagement block 64 directly. Further alternatively, the present invention may replace the lock pin 62 with any fixture which can lock and maintain the open state of the valve body 46.

In the present invention, the fuel cell system 10 has a high-voltage battery and a low-voltage battery, which are not shown in the drawings. The ECU 100 drives the rotational driving source 56 of the valve-driving section 52 and the solenoid of the locking section 54 by using the low-voltage battery.

The back-pressure-regulating valve 38 for controlling the pressure in the cathode of the fuel cell 12 may be, for example, a normally-open butterfly valve whose opening is variable. The back-pressure-regulating valve 38 is connected with the diluting apparatus 34 through the pipe c5.

The diluting apparatus 34 dilutes the non-reacted hydrogen discharged through the purge valve 32 by mixing cathode off-gas discharged from the cathode, and then discharges the diluted hydrogen outside the fuel cell vehicle. The cathode system 16 has a humidifier, not shown in the drawings, in the pipe c1 for humidifying air supplied by the air pump 26.

The anode-scavenging system 18 includes: an air introduction pipe 70; an air-introduction valve 72; an air-discharging pipe 74; and an air-discharging valve 76 etc.

The air introduction pipe 70 has an upstream end and a downstream end. The upstream end of the air introduction pipe 70 is connected with the pipe c1, and the downstream end of the air introduction pipe 70 is connected with the pipe a2. Air (also called scavenging gas or oxidant gas) supplied from the air pump 26 is introduced into the anode through the pipe c1, the air-introduction valve 72, the air introduction pipe 70, and the pipe a2 in this order. ECU 100 opens the air-introduction valve 72 when scavenging the anode after stopping the electro-chemical reaction progressing in the fuel cell 12.

The air-discharging pipe 74 has an upstream end and a downstream end. The upstream end of the air-discharging pipe 74 is connected with the pipe a3, and the downstream end of the air-discharging pipe 74 is connected with the pipe c5. The air discharged (i.e. gas scavenged) from the anode is returned to the back-pressure-regulating valve 38 of the cathode system 16 through the pipe a3, air-discharging pipe 74, air-discharging valve 76. ECU 100 opens the air-discharging valve 76 when scavenging the anode.

The control system 20 includes: the ECU 100; a temperature sensor 102 for detecting the temperature of the fuel cell 12; and a timer 104 etc.

The ECU 100 includes a central processing unit (CPU); a read-only memory (ROM) storing a program for controlling a scavenging process; and a random access memory (RAM) etc. The ECU 100 opens or closes the shut-off valve 30, the purge valve 32, the first shut-off valve 36a, the second shut-off valve 36b, the air-introduction valve 72, and the air-discharging valve 76. The ECU 100 also controls a valve-driving section 52 and a locking section 54 of each shut-off valve. The ECU 100 controls the rotation speed of the motor provided in the air pump 26 to adjust the opening degree of the back-pressure-regulating valve 38. The ECU 100 measures elapsed time after stopping the electro-chemical reaction progressing in the fuel cell 12 by using the temperature sensor 102.

Hereinafter, operations and effects of the fuel cell system 10 according to the present embodiment having the aforementioned basic structure will be explained with reference to FIGS. 3A to 3C.

In first case of the embodiment, an ignition switch of the fuel cell vehicle is turned off and electro-chemical reaction is stopped.

When a driver turns off the ignition switch, the ECU 100 sends a control signal to the shut-off valve 30 to stop the hydrogen from being supplied to the fuel cell 12. In addition, the ECU 100 stops the motor, not shown in the drawings, of the air pump 26 and stops the air from being supplied to the fuel cell 12. While the electro-chemical reaction is kept from progressing in the fuel cell 12, the cathode of the fuel cell 12 is sealed with both the first shut-off valve 36a and the second shut-off valve 36b closed.

More specifically, while the electro-chemical reaction is kept from progressing in the fuel cell 12, the normally-closed valve body 46 of each shut-off valve 36a or 36b is kept pressed onto the seat section 48 by a spring force of the spring 50 as shown in FIG. 3A. Accordingly, communication is shut off between the inlet port 40a and the outlet port 40b with both the first shut-off valve 36a and the second shut-off valve 36b closed. In this state, no electricity flows from the batteries included in the fuel cell system 10 to the rotational driving source 56 of the valve-driving section 52 and to the locking section 54 for exciting the solenoid.

Therefore, the present invention is capable of preventing air from entering the cathode flowpath 24 while the electro-chemical reaction is stopped from progressing in the fuel cell 12, and is capable of preventing gas crossover which may reduce power output efficiency of the fuel cell 12, since the ECU 100 controls the normally-closed shut-off valves 36a and 36b to seal the cathode of the fuel cell 12.

In a second case of the present embodiment, an ignition switch of the fuel cell vehicle is turned on to start the fuel cell system 10. The ECU 100 opens the first shut-off valve 36a and the second shut-off valve 36b to unseal the cathode, and opens the shut-off valve 30 to supply hydrogen stored in the hydrogen tank 28 to the anode. The ECU 100 drives the air pump 26 to supply air to the cathode, and then the electro-chemical reaction starts progressing in the fuel cell 12.

While the fuel cell system 10 is in operation, the air-introduction valve 72 and the air-discharging valve 76 are kept closed, and if necessary, the ECU 100 opens the purge valve 32 to discharge impurities, such as nitrogen or water permeating from the cathode through the electrolyte membrane to the anode and remaining in an anode circulation system including the pipes a2 to a4 and the anode flowpath 22.

Hereinafter, a valve-switching operation conducted by the ECU 100 will be explained in detail for opening the shut-off valves 36a and 36b both closed, and for locking the shut-off valves 36a and 36b both opening.

Firstly, the ECU 100 supplies electricity to the solenoid of the locking section 54 of each shut-off valve when the ECU 100 recognizes that the driver of the fuel cell vehicle turns on the ignition switch. The excitation effect of the solenoids moves movable cores (not shown in the drawings) together with the lock pins 62 in the retracting direction indicated by an arrow X2 shown in FIG. 3B. After that, the ECU 100 supplies electricity to the rotational driving source 56 of the valve-driving section 52 to rotate the pinion 58 in the counter clockwise direction (indicated by an arrow X3) to overcome the downward spring force of the spring 50. Each valve body 46 is elevated by the pinion 58 and the rack section 60 which are in mesh with each other.

Accordingly, the valve body 46 in each shut-off valve is lifted off from the seat section 48 by a predetermined distance since the rotational movement of the rotational driving source 56 is converted to a linear movement through the pinion 58 and the rack section 60 which are in mesh with each other. Therefore, the inlet port 40a comes to communication with the outlet port 40b through the chamber 44.

After opening the shut-off valves 36a and 36b, the ECU 100 stops electricity from being supplied to the solenoid of the locking section 54 of each shut-off valve for not exciting the solenoid. A return spring, not shown in the drawings, extends the lock pin 62 in direction X1 as shown in FIG. 3C by a predetermined length. The lock pin 62 locks the engagement block 64 to maintain each shut-off valve opened.

After locking the shut-off valves 36a and 36b in open state, the ECU 100 sends a control signal to the aforementioned low-voltage battery to stop supplying electricity to the rotational driving source 56. As a result, the fuel cell system 10 can save electricity since the rotational driving source 56 consumes no electricity while the shut-off valves 36a and 36b are maintained open through the engagement between the lock pin 62 and the engagement block 64.

In an attempt to unlock both the shut-off valves 36a and 36b, the ECU 100 supplies electricity to the solenoid of the locking section 54. Then, the movable core moves together with the lock pin 62 in the direction X2 with the excitation effect of the solenoid. The engagement block 64 is released from the lock pin 62, and then the spring 50 presses the valve body 46 onto the seat section 48 with its spring force.

Figure 4:
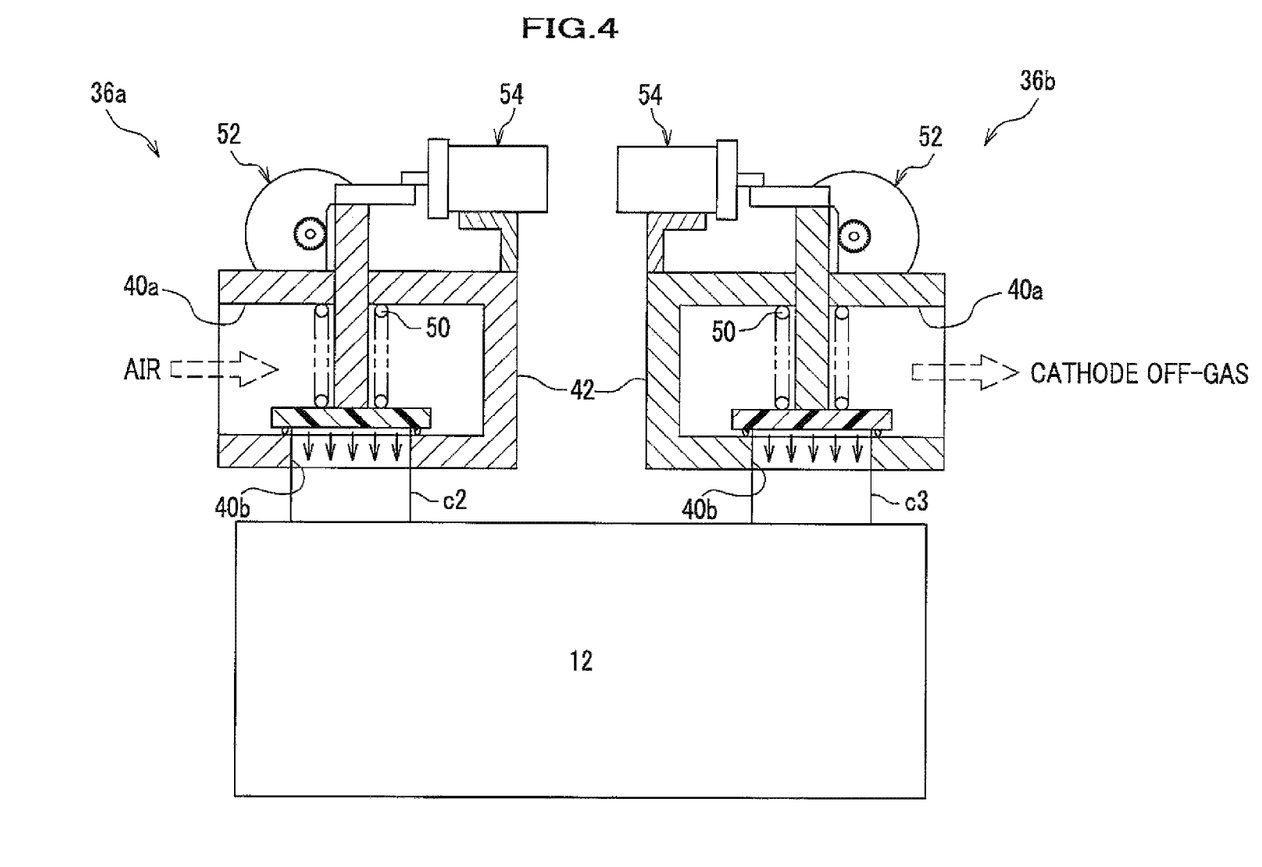
FIG. 4 is a longitudinal cross-sectional view showing the shut-off valves each having a disc sucked toward the fuel cell by negative pressure produced in the fuel cell.

As shown in FIG. 4, the fuel cell system 10 allows the valve body 46 to be sucked toward the seat section 48 by negative pressure since air (oxygen) is consumed to some degree in the cathode even if the shut-off valves 36a and 36b are closed to seal the cathode.

The present invention can use the spring 50 having a weaker spring force for pressing the valve body 46 toward the seat section 48 since the fuel cell system 10 has air flow direction which can obtain negative pressure assisting the valve body 46 to close each shut-off valve. Therefore, the fuel cell system 10 can move the valve body 46 with a weaker force to open each shut-off valve.

The fuel cell system 10 according to the present embodiment is capable of maintaining the first shut-off valve 36a and the second shut-off valve 36b in open state stably and reliably while avoiding reduced efficiency in terms of electricity output, since each shut-off valve has the locking section 54 for maintaining the valve body 46 in open state after the valve-driving section 52 drives the valve body 46 and maintains the valve body 46 in open state, and since the valve-driving section 52 does not consume electricity to maintain the valve body 46 in open state.

The present invention is capable of preventing damage to the fuel cell system 10 or system down of the fuel cell system 10 due to abnormal pressure since the locking section 54 locks and maintains the valve body 46 in open state, that is, the locking section 54 in no case switches the valve body 46 from open state to closed state even if the valve-driving section 52 for driving the valve body 46 has a defect such as power drop if the valve-driving section 52 is driven electrically as explained according to the present embodiment, or abnormal air pressure if the valve-driving section 52 is a pneumatic unit not shown in the drawings.

The fuel cell system 10 can save electricity by stopping electricity from being supplied to the rotational driving source 56 while the valve body 46 is maintained open, since the valve-driving section 52 needs no force for maintaining the valve body 46 in open state. If the fuel cell system 10 uses pneumatic valve-driving sections 52, the present invention can reduce the number of parts used in the shut-off valves 36*a* and 36*b* because a pneumatic valve-driving section 52 can eliminate a pressure-control mechanism.

In addition, if the fuel cell system 10 uses the electrically-driven valve-driving sections 52, the fuel cell system 10 of the present embodiment can achieve a more simple and downsized mechanism since the valve-driving section 52 having the rotational driving source 56 using an electric motor can eliminate a complex air-pressure control system including a regulator, a plurality of air-flow control valves and air-switching valves for moving the valve body 46.

What is claimed is:

1. A fuel cell system, comprising:
   a fuel cell having an anode to which fuel gas is supplied, and a cathode to which oxidant gas is supplied;
   a first oxidant gas flowpath through which the oxidant gas is supplied to the fuel cell;
   a second oxidant gas flowpath through which the oxidant gas is discharged from the fuel cell;
   a first shut-off valve, being normally closed, disposed upstream from the fuel cell and connected to the fuel cell through the first oxidant gas flowpath, the first shut-off valve having a first valve body having a first engagement block connected via a first rod and disposed outside the first shut-off valve;
   a second shut-off valve, being normally-closed, disposed downstream from the fuel cell and connected to the fuel cell through the second oxidant gas flowpath, the second shut-off valve having a second valve body having a second engagement block connected via a second rod and disposed outside the second shut-off valve;
   a first opening/closing unit for opening and closing the first shut-off valve;
   a second opening/closing unit for opening and closing the second shut-off valve;
   a cathode control unit for sealing the cathode by closing the first shut-off valve and the second shut-off valve by using the first opening/closing unit and the second opening/closing unit after stopping electro-chemical reaction in the fuel cell and for releasing the sealed cathode by opening the first shut-off valve and the second shut-off valve by using the first opening/closing unit and the second opening/closing unit after starting the electro-chemical reaction in the fuel cell;
   a first valve lock unit having a first lock member and locking the first shut-off valve in an open state by engaging the first lock member with the first engagement block of the first shut-off valve; and
   a second valve lock unit having a second lock member and locking the second shut-off valve in an open state by engaging the second lock member with the second engagement block of the second shut-off valve,
   wherein the first valve lock unit and the second valve lock unit include respectively a first locking section and a second locking section which keep respectively the first shut-off valve and the second shut-off valve opened and unable to be closed while the first shut-off valve and the second shut-off valve are mechanically locked.

2. The fuel cell system according to claim 1, wherein the first opening/closing unit has a first electric drive unit for supplying electricity to the first shut-off valve to drive the first shut-off valve from a closed state to the open state, the second opening/closing unit has a second electric drive unit for supplying electricity to the second shut-off valve to drive the second shut-off valve from a closed state to the open state, and the cathode control unit stops supplying electricity to the first and second electric drive units after the first and second shut-off valves are locked in the open state by the first and second valve lock units.

3. The fuel cell system according to claim 1 or 2, wherein, negative pressure produced in the cathode sealed by the cathode control unit sucks the first valve body of the first shut-off valve in the closed state toward the fuel cell; sucks the second valve body of the second shut-off valve in the closed state toward the fuel cell; and maintains the first shut-off valve and the second shut-off valve in the closed state.

4. The fuel cell system according to claim 1, further comprising a
   back-pressure-regulating valve disposed downstream from the second shut-off valve.

5. A fuel cell system according to claim 1,
   wherein the first opening/closing unit includes:
      a first rotational driving source driven by supplying electricity;
      a first pinion connected to a first drive shaft of the first rotational driving source;
      a first valve housing having a first inlet port, a first outlet port and a first chamber each communicating with the first oxidant gas flowpath and receiving a first valve body in the first chamber;
      a first rod section connected to the first valve body for displacing integrally with the first valve body and exposed outside from the first valve housing; and
      a first rack section provided to an outer periphery of the first rod section and meshing with the first pinion,
   wherein the first locking section includes:
      a first solenoid provided outside of the first valve housing;
      the first lock member which extends or retracts by the first solenoid under the excitation effect or non-excitation effect; and
      the first engagement block connected to a free end of the first rod section and which is lockable by the first lock member,
   wherein after the first locking section keeps the first shut-off valve opened, the first rotational drive source is stopped from being energized,
   wherein the second opening/closing unit includes:
      a second rotational driving source driven by supplying electricity;
      a second pinion connected to a second drive shaft of the second rotational driving source;
      a second valve housing having a second inlet port, a second outlet port and a second chamber each communicating with the second oxidant gas flowpath and receiving a second valve body in the second chamber;

a second rod section connected to the second valve body for displacing integrally with the second valve body and exposed outside from the second valve housing; and a second rack section provided to an outer periphery of the second rod section and meshing with the second pinion, wherein the second locking section includes:

the second lock member which extends or retracts by the second solenoid under the excitation effect or non-excitation effect; and the second engagement block connected to a free end of the second rod section and which is lockable by the second lock member, and wherein after the second locking section keeps the second shut-off valve opened, the second rotational drive source is stopped from being energized.

* * * * *